April 28, 1931. F. G. BAUM 1,802,865
MEANS FOR COOLING ROTATING ELECTRIC MACHINES
Filed Sept. 13, 1929
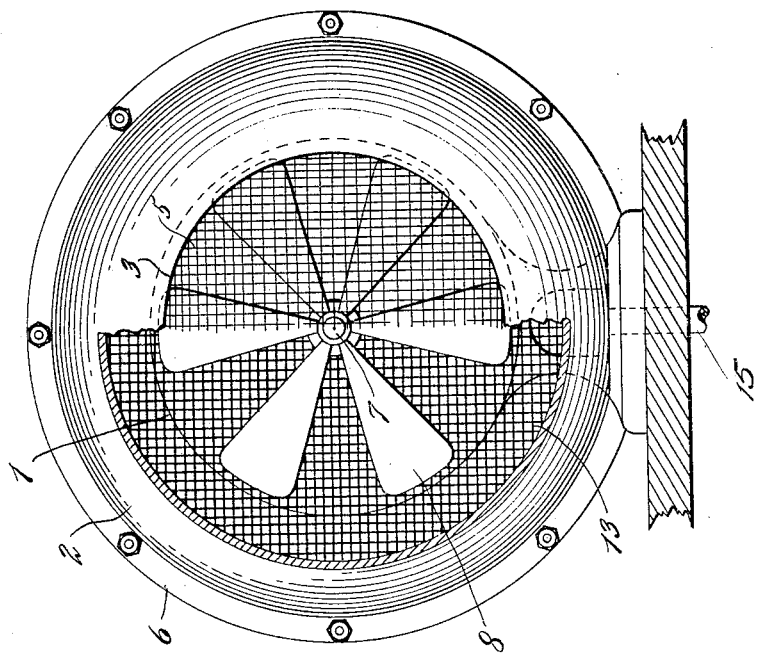
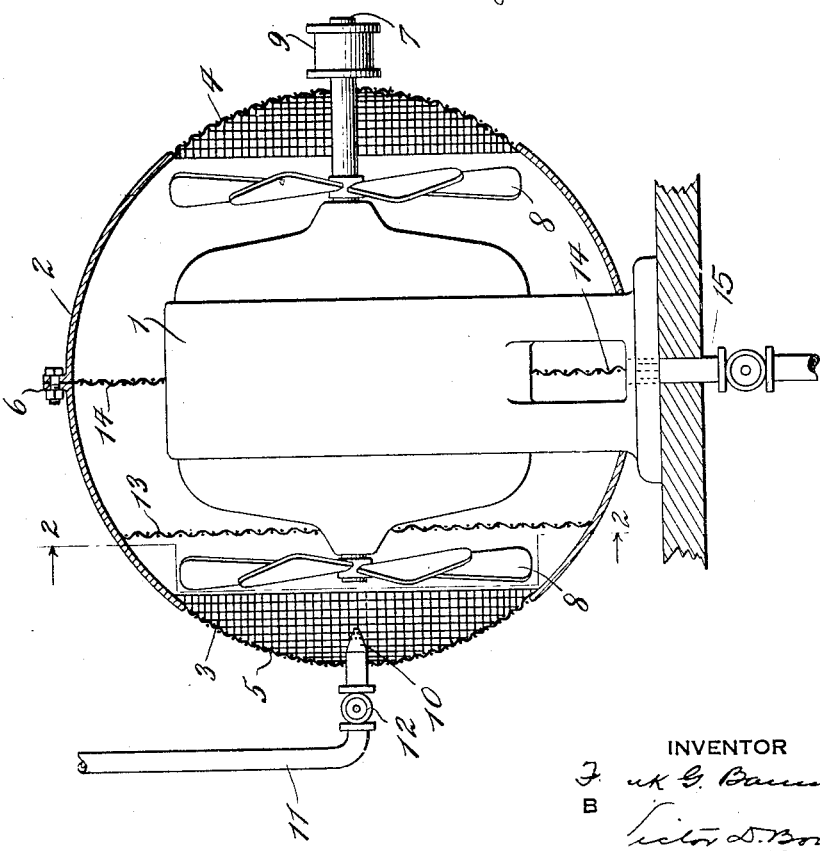
INVENTOR
Frank G. Baum
B
Victor D. Borst
ATTORNEY Patented Apr. 28, 1931

1,802,865

UNITED STATES PATENT OFFICE

FRANK G. BAUM, OF CASSEL, CALIFORNIA

MEANS FOR COOLING ROTATING ELECTRIC MACHINES

Application filed September 13, 1929. Serial No. 392,420.

A portion of the energy expended in rotating electric machines is utilized in overcoming electrical resistance, core losses and mechanical friction, and appears in the form of heat. The ability of a machine to radiate or dissipate the heat generated by the various losses therein determines the capacity or continuous rating of the machine, and it is a purpose of my invention to increase the rate of dissipation of heat, and consequently, the capacity of such machines.

The ordinary rotating electric machine depends upon the exposed surfaces thereof for radiating and transferring the heat generated therein to the surrounding atmosphere. In open machines the transfer of heat to the surrounding atmosphere is somewhat aided by the movement of the rotating part, which movement stirs up the air adjacent the machine, thereby causing a greater volume of air to come into contact with the exposed parts of the machine. In some instances fan blades have been secured to the rotating part of the machine in order to increase the circulation of air through the machine and augment the dissipation of heat therefrom.

In one instance, as described by my prior Patent No. 987,536, granted March 21, 1911, the cooling of rotating electric machines has been accomplished by circulating air saturated with moisture and carrying entrained moisture in the form of finely divided particles through conduits disposed adjacent to and heated by the parts to be cooled. Within the conduit, the moisture entrained in the air is evaporated by heat absorbed from the conduit. The air, free of entrained moisture, is then circulated over the parts of the machine. For large machines, this method has proven to be advantageous and efficient. However, because of the auxiliary blower and conduits utilized in the practical embodiment of the principle involved, it has heretofore been, to a certain extent, restricted to large machines.

By the present invention, I am enabled to dispense with the auxiliary blower and conduits in applying the principle of cooling by evaporation to rotating electric machines. I employ a construction in which the air charged with moisture is caused to flow in contact with the frame of the machine by a fan secured to the rotating shaft of the machine.

A feature of my invention is the fact that I provide an outer casing around the machine which is spaced therefrom to provide a passage for the moisture charged air, the casing having opposed inlet and outlet openings in alignment with the shaft of the machine.

Another feature of my invention is the fact that I provide a fluid distributor within the casing adjacent the inlet thereto for introducing moisture in finely divided particles into the air.

A further feature of my invention is the fact that the air flowing through the casing by way of the openings therein is forced through foraminous partition walls which are maintained in a moist condition and from which moisture is evaporated.

Other features and advantages of my invention will hereinafter more particularly appear and the invention will be pointed out in claims.

In practicing my invention, I provide an outer casing which surrounds the rotating electric machine and which is spaced therefrom to provide a chamber between the outer casing and the frame of the machine. The outer casing is provided with opposed inlet and outlet openings in alignment with the shaft of the machine enclosed thereby. Within the casing a fan is mounted on the shaft of the machine to rotate therewith and cause the air to flow through the casing by way of said openings. Adjacent the inlet to the casing, a fluid distributor is mounted within the casing for introducing moisture into the air passing through the casing. Behind the fluid distributor, relative to the direction of movement of the air within the casing, foraminous partition walls transverse to the direction of movement of the air are provided through which the air is forced. The transverse foraminous partition walls are maintained in a moist condition and, in addition to the heat absorbed from the machine and from the air by evaporation of the moisture contained therein, removes heat from the air by the transfer of excess moisture thereto.

I shall now describe one embodiment of my invention in connection with the accompanying drawings, in which:

Fig. 1 is a longitudinal elevation of a rotating electric machine, the outer casing being in section; and Fig. 2 is an end elevation of the same, with one half of the casing being removed.

The embodiment of this invention as illustrated, comprises a motor 1 which is surrounded by a spherical outer casing or housing 2. The housing 2 is constructed of sheet metal bent to the desired shape. Diametrically opposed openings 3 and 4 are provided in the wall of the casing and constitute inlet and outlet openings respectively. The openings 3 and 4 are covered by screens 5. The housing may desirably be constructed in two sections, each section being semispherical in shape and having an opening at the center of its surface. At the edge of the sections of the housing, flanges 6 may be provided for the purpose of securing the parts together by means of bolts. The housing is so located with respect to the motor that the center of the motor is substantially at the center of the housing and the shaft of the motor is in alignment with the centers of the inlet and outlet openings. The relationship between the motor and its housing is such as to be conducive to the setting up of a stream line flow of air flowing therebetween.

The motor 1 is of the closed type and has the shaft 7 thereof extended beyond both bearing boxes. On the extended ends of the shaft, within the housing 2, adjacent the openings therein, fans 8 are mounted to rotate therewith. The rotation of the fans 8 cause air to flow through the housing by way of the inlet and outlet openings 3 and 4. At the outlet side of the casing the shaft 7 is extended through the housing 2 for the purpose of securing a driving pulley or gear 9 thereto.

Within the casing adjacent the inlet opening therein, in advance of the fan 8, relative to the direction of flow of the air therethrough, a spray forming device 10 is mounted. The spray forming device is connected by means of a conduit 11 to a source of fluid supply (not shown). A suitable valve 12 is interposed between the conduit and the spray forming device to regulate the rate at which the fluid is introduced into the air.

Between the fans 8, two transverse screens are mounted in the housing 2, the screen 13 being located directly behind the fan adjacent the inlet opening, and the screen 14 being located at the center of the housing.

At the lowermost point of the casing a drain pipe 15 is connected to the interior of the casing for draining excess moisture deposited upon the screens 13 and 14 by the air flowing through the casing.

The operation of the device is as follows:

During the operation of the motor, the fans 8, secured to the shaft thereof, are rotated and cause a current of air to flow through the housing 2 by way of the openings 3 and 4 therein. At the inlet 3 to the housing, moisture is introduced into the air in finely divided particles by the spray forming device 10. Some of the moisture introduced into the air is evaporated by the air, the evaporation of the moisture being accomplished by the expenditure of heat energy carried by the air, thereby cooling the air. A portion of the moisture not evaporated by the air is entrained therein in the form of finely divided particles, the major portion of which is deposited upon the screens 13 and 14. The remainder of the entrained moisture is evaporated by heat absorbed from the motor either by coming directly into contact with the frame of the motor, or by heat transferred from the motor to the air flowing through the casing. Thus, the heat developed in the motor is expended in evaporating moisture, either by direct evaporation, as when the particles of moisture come into contact with the frame of the motor, or indirectly by transferring the heat to the air passing through the casing which heat is utilized in evaporating the moisture carried by the air.

The screens 13 and 14, upon which some of the entrained moisture is deposited, prevent the air flowing through the casing from carrying entrained moisture into the room in which the motor is located and at the same time present a large moistened surface through which the air must pass and from which moisture may be taken up by the air and evaporated by the heat contained therein. The excess moisture deposited upon the screens flows to the bottom of the housing from which it is drained through the drain pipe 15.

In cooling by evaporation as is done in the construction shown in the drawings and above particularly described, the quantity of water required to cool the mechanism is much less than that required in constructions in which the mechanism is cooled by the transfer of heat to the cooling water. The reason a much less quantity of water is required in cooling by evaporation is the fact that 970 B. t. u. are required to evaporate one pound of water, whereas when the heat is transferred to the cooling water to raise the temperature thereof, only one B. t. u. is absorbed by a pound of water for each degree rise in temperature.

It is to be noted that during the operation of the cooling device above described the air of the room in which the motor is located is cooled and humidified.

It is obvious that various changes may be made in the illustrated embodiment above particularly described within the principle and scope of my invention as expressed in the appended claims.

Claims:

1. A rotating electric machine, a housing surrounding said machine and spaced therefrom, said housing having openings therethrough in alignment with the shaft of said machine, a fan secured to said shaft adjacent the inlet end of the casing for causing air to flow through said casing, a spray associated with the fan at the inlet end of the casing, the fan acting as a distributor of the water emitted from the spray, and means for delivering water to the spray.

2. A rotating electric machine, a housing surrounding said machine and spaced therefrom, said housing having openings therethrough in alignment with the shaft of said machine, means secured to said shaft for causing air to flow through said casing by way of said opening, screens within said casing transverse to the direction of movement of the air therein, and means for maintaining said screens in a wet condition.

3. A rotating electric machine, a housing surrounding said machine and spaced therefrom, said housing having openings, therethrough in alignment with the shaft of said machine, means secured to said shaft for causing air to flow through said housing by way of said openings, screens within said casing transverse to the direction of movement of the air therein and means in advance of the electric machine relative to directions of movement of the air in the housing for introducing a liquid in finely divided particles into the air to be entrained therein.

4. A rotating electric machine having the shaft thereof extending through the end of the frame, a housing surrounding said machine and spaced therefrom, said housing having openings therethrough in alignment with the shaft of said machine, a fan secured to said shaft adjacent the inlet opening in the housing for causing air to flow through the housing by way of said openings, screens within said casing transverse to the direction of movement of the air in the housing, and a spray forming device in advance of the fan relative to the direction of flow of the air through said housing for introducing moisture in the form of finely divided particles into the air.

5. A rotating electric machine having the shaft thereof extending through the end of the frame, a housing surrounding said machine and spaced therefrom, said housing having inlet and outlet openings therethrough in alignment with the shaft of said machine and being designed to cause air flowing through the housing by way of said openings to assume a stream line flow, a fan within said housing mounted on the shaft of said machine to cause air to flow through said casing by way of the openings therein, screens within said casing transverse to the direction of movement of the air therein, and a spray forming device adjacent the inlet in the housing for introducing moisture into the air flowing therethrough.

6. A rotating electric machine having the shaft thereof extending through both ends of the frame, a spherical housing surrounding said machine and spaced therefrom, said housing having diametrically opposed openings therein in alignment with the shaft on said machine, fans within said housing adjacent the openings therein mounted upon the shaft of said machine to cause air to flow through said housing by way of said openings, transverse screens in said housing, and a spray forming device within said housing adjacent the inlet thereto for introducing moisture into the air flowing therethrough.

7. A rotating electric machine having the shaft thereof extending through both ends of the frame, a spherical housing surrounding said machine and spaced therefrom, said housing having diametrically opposed openings therein in alignment with the shaft of said machine, fans within said housing adjacent the openings therein mounted upon the shaft of said machine to cause air to flow through said housing by way of said openings, transverse screens within said housing between said fans, and a spray forming device within said housing adjacent the inlet thereto for introducing moisture into the air flowing therethrough.

In witness whereof, I hereunto subscribe my signature.

FRANK G. BAUM.